(12) United States Patent
Peroni et al.

(10) Patent No.: US 12,079,958 B2
(45) Date of Patent: Sep. 3, 2024

(54) METHOD OF AND APPARATUS FOR CREATING AN ALL-IN-FOCUS IMAGE OF A PORTION OF AN IRIDOCORNEAL ANGLE OF AN EYE

(71) Applicant: NIDEK CO. LTD., Aichi (JP)

(72) Inventors: Andrea Peroni, Venice (IT); Andrea De Giusti, Padua (IT); Michele Pascolini, Padua (IT); Mattia Minozzi, Legnaro (IT); Simone Pajaro, Padua (IT)

(73) Assignee: NIDEK CO., LTD., Aichi (JP)

( * ) Notice: Subject to any disclaimer, the term of this patent is extended or adjusted under 35 U.S.C. 154(b) by 431 days.

(21) Appl. No.: 17/602,622

(22) PCT Filed: Apr. 15, 2020

(86) PCT No.: PCT/IB2020/053546
§ 371 (c)(1),
(2) Date: Oct. 8, 2021

(87) PCT Pub. No.: WO2020/212861
PCT Pub. Date: Oct. 22, 2020

(65) Prior Publication Data
US 2022/0198630 A1 Jun. 23, 2022

(30) Foreign Application Priority Data
Apr. 19, 2019 (IT) .................. 102019000006124

(51) Int. Cl.
*G06T 7/13* (2017.01)
*G06T 5/50* (2006.01)
(Continued)

(52) U.S. Cl.
CPC .................. *G06T 5/50* (2013.01); *G06T 5/70* (2024.01); *G06T 5/90* (2024.01); *G06T 7/13* (2017.01);
(Continued)

(58) Field of Classification Search
CPC .... G06T 5/50; G06T 5/70; G06T 5/90; G06T 7/13; G06T 7/30; G06T 2207/20028; G06T 2207/30041
See application file for complete search history.

(56) References Cited

PUBLICATIONS

Yin, Xuanwu, et al. "Large aperture focus stacking with max-gradient flow by anchored rolling filtering." Applied optics 55.20 (2016): 5304-5309. (Year: 2016).*

* cited by examiner

*Primary Examiner* — Amandeep Saini
*Assistant Examiner* — Denise G Alfonso
(74) *Attorney, Agent, or Firm* — RANKIN, HILL & CLARK LLP (57) ABSTRACT

The method is used for creating an all-in-focus image of a portion of an iridocorneal angle of an eye starting from a plurality of images (610), these images being shallow field-depth images of that portion taken with different focus planes but with a same image frame; the method comprises the steps of: A) pre-processing (620) said plurality of images so to obtain a plurality of single-channel images if the images of said plurality are color images, B) calculating (630) an initial focus map starting from said plurality of single-channel images, C) creating (640) an initial estimated all-in-focus image starting from said initial focus map and said plurality of single-channel images, D) calculating (650) an initial edge map starting from said initial focus map and said plurality of single-channel images, E) iterating (660) a regularization process until a stop regularization condition is met, wherein the regularization process comprises removing
(Continued)

one or more edge points of the initial edge map by considering a reference model of an iridocorneal angle of an eye, F) creating (670) said all-in-focus image starting from said plurality of images and a focus map last calculated in step E; the reference model expresses at least one geometrical parameter of a surface of an iridocorneal angle of an eye.

14 Claims, 6 Drawing Sheets

(51) Int. Cl.
*G06T 5/70* (2024.01)
*G06T 5/90* (2024.01)
*G06T 7/30* (2017.01)
(52) U.S. Cl.
CPC ...... *G06T 7/30* (2017.01); *G06T 2207/20028* (2013.01); *G06T 2207/30041* (2013.01)

METHOD OF AND APPARATUS FOR CREATING AN ALL-IN-FOCUS IMAGE OF A PORTION OF AN IRIDOCORNEAL ANGLE OF AN EYE

TECHNICAL FIELD

The present invention relates to a method of and an apparatus for creating an all-in-focus image of a portion of an iridocorneal angle of an eye.

BACKGROUND

In the field of eye imaging, images have very often shallow or narrow field-depth while it would be desirable to have wide field-depth.

However, current optical systems for eye imaging application do not allow to obtain directly wide field-depth images.

Recently, it has been conceived to obtain indirectly a wide field-depth image by combining a plurality of shallow field-depth images; this is known as "Focus Stacking". For example in the field of mobile phones, some apparatuses on the market are able to combine two or three or four images taken from distinct cameras that are close to each other.

A method for creating an all-in-focus color images is known for example from the article of Xuanwu Yin et al. entitled "large aperture focus stacking with max-gradient flow by anchored rolling filtering" published on the magazine "Applied Optics", Vol. 55, No. 20, in July 2016.

It would be difficult to use prior-art "Focus Stacking" technology (including the one from the above-mentioned article) in the field of eye imaging due in particular to technical difficulties and/or unsatisfactory results. This is even more true for imaging of the iridocorneal angle of the eye.

SUMMARY

The Applicant has thought of improving the method described in the above-mentioned article in order to use "Focus Stacking" for imaging of the iridocorneal angle of the eye.

Figure 1:
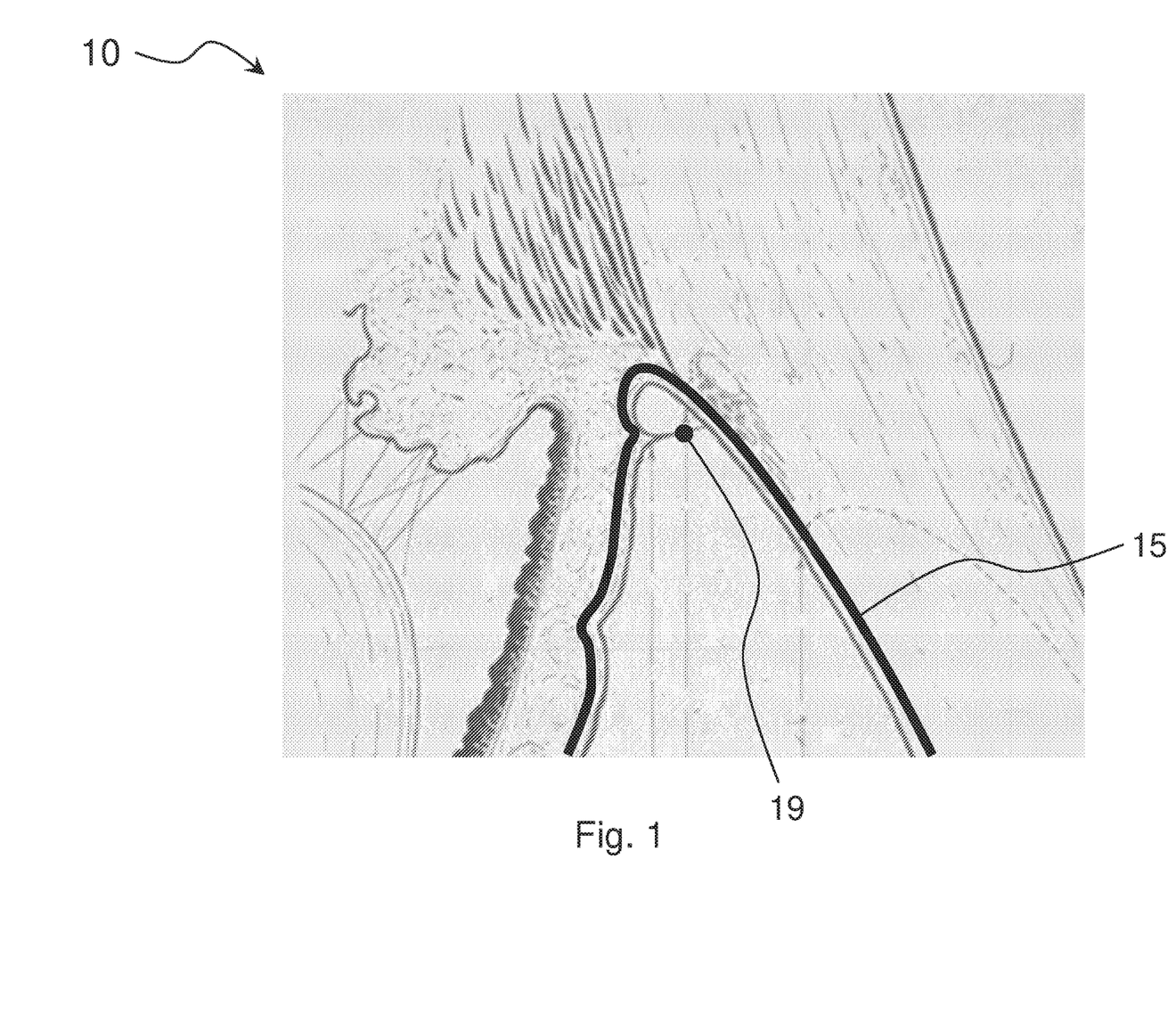
FIG. 1 illustrates a cross-section of a portion of an eye including an iridocorneal angle of the eye.

Annexed FIG. 1 shows a cross-section of a portion 10 of an eye including an iridocorneal angle of the eye. An iridocorneal angle defines an iridocorneal angle surface between the tissues and the aqueous humor (see superimposed thick line that is slighted spaced from the true profile of this surface for clarity reasons); following this surface, we encounter: the iris, the ciliary body, the scleral spur, the pigmented trabecular meshwork, the non-pigmented trabecular meshwork, the Schwalbe's line, and the cornea. As this figure highlights, the iridocorneal angle surface is continuous and regular; it is to be noted that there may be fine and rather long anatomical structures projecting from this continuous and regular surface, such as "iris processes" (that are also shown in FIG. 1 and labeled 19). Considering the wish to apply a "Focus Stacking" technology to such iridocorneal angle surface, being in particular a continuous and regular surface, first specific assumptions might/should be made.

Figure 2:
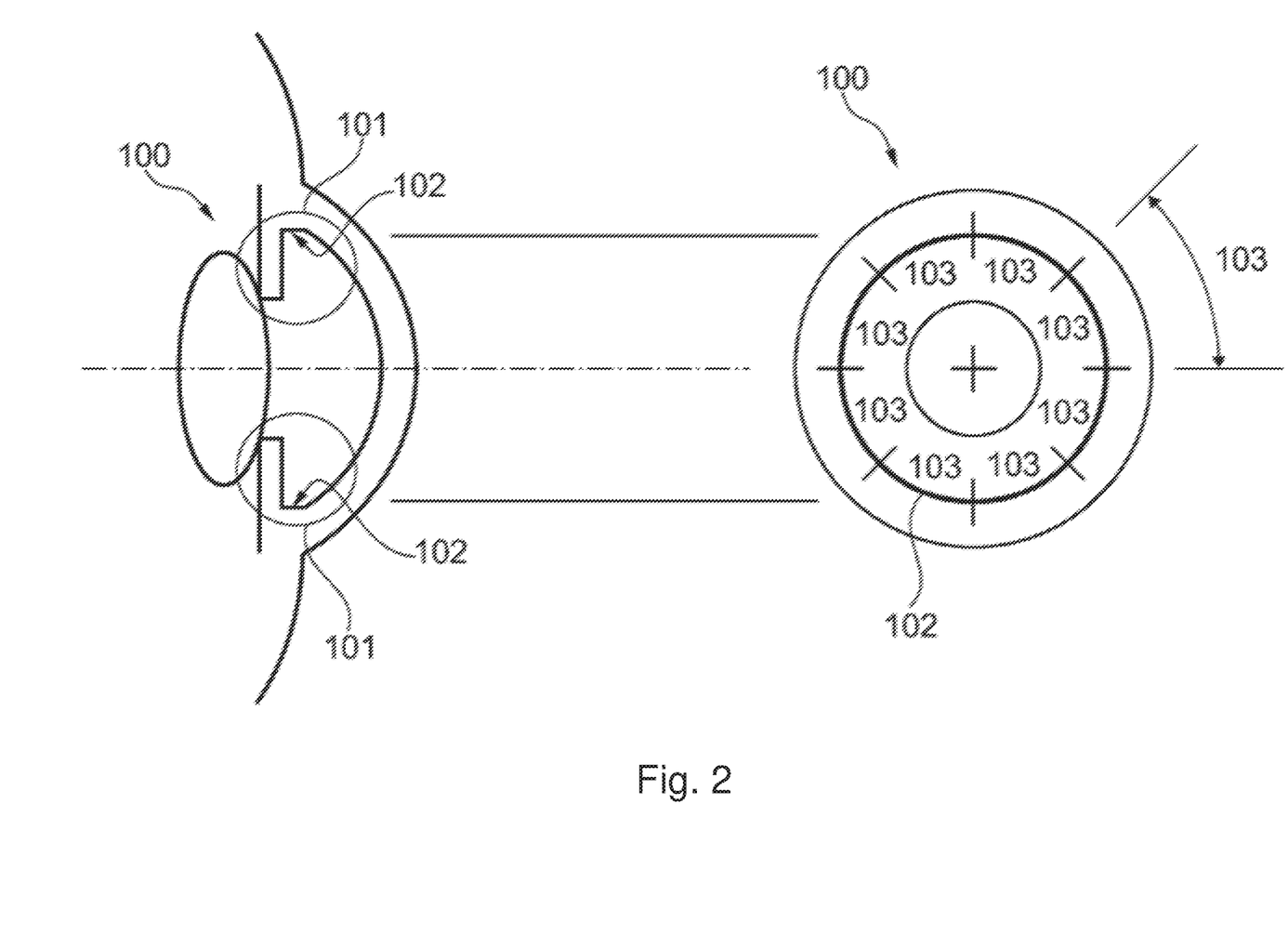
FIG. 2 illustrates a simplified cross-section view and a simplified front view of an eye, and corresponds to FIG. 1 of WO2015180923A1.
Figure 3:
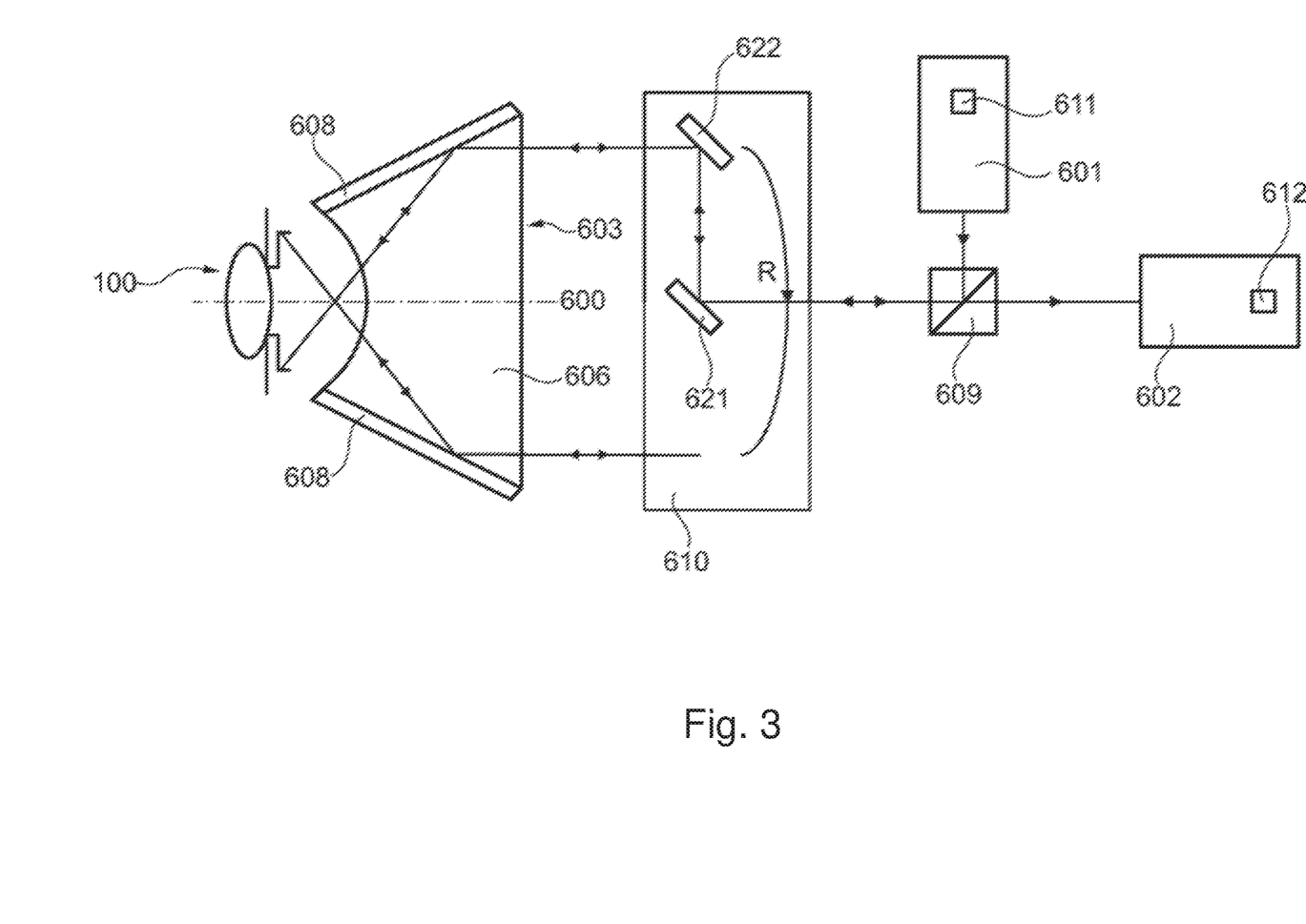
FIG. 3 illustrates a simplified block diagram of an optical equipment suitable for observation of eye iridocorneal angle, and corresponds to FIG. 6 of WO2015180923A1.

Considering the type and quality of images that can be taken of such iridocorneal angle surface, second specific assumptions might/should be made. These images may derive for example from the use of an apparatus as described in patent document WO2015180923A1 and/or for example from the use of an apparatus as sold by NIDEK under the trade name "Gonioscope GS-1". For clarity reasons, annexed FIG. 2 corresponds to FIG. 1 of WO2015180923A1 and annexed FIG. 3 corresponds to FIG. 6 of WO2015180923A1; description of these two figures may be found in the specification of WO2015180923A1.

According to one aspect, the present invention relates to a method of creating an all-in-focus image of a portion of an iridocorneal angle of an eye starting from a plurality of images as set out in independent claim n° 1 and its dependent claims. Such method is based on the use of a reference model that expresses at least one geometrical parameter of a surface of an iridocorneal angle of an eye.

Such method has several advantages as explained in the following.

The all-in-focus images produced through such method allow a doctor (or technician) to have a complete and optimal view of the iridocorneal angle, in particular of one or more selected iridocorneal angle sectors, without the need to manually identify the best focus plane for the investigation to be carried out.

The all-in-focus images produced through such method make easier both the display on a medical apparatus screen and the interaction of a doctor (or technician) with a medical apparatus.

The all-in-focus images produced through such method allow to have an estimation (within a good level of approximation) of the amplitude of an iridocorneal angle all around the eye which is very important from the diagnostic and screening point of view.

According to another aspect, the present invention relates to computer program product loadable into the internal memory of a digital computer as set out in claim n° 15.

According to still another aspect, the present invention relates to an apparatus for creating an all-in-focus color image of a portion of an iridocorneal angle of an eye as set out in claim n° 16.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

It is to be noted that the present invention is not restricted to what described in the following, but its scope is determined solely by the appended claims.

DETAILED DESCRIPTION OF EMBODIMENTS

The method according to the present invention aims at creating an all-in-focus image of a portion of an iridocorneal angle of an eye starting from a plurality of images. Preferably, the all-in-focus image is a color image. Typically (even if not necessarily), the images of the plurality, that may be called "starting images", are bidimensional color images.

The "starting images" may derive from illuminating at least a portion of an iridocorneal angle of an eye through light either in a visible spectrum (i.e. light with wavelengths in the range from approximately 400 nm to approximately 750 nm) or in an infrared spectrum (i.e. light with wavelengths beyond approximately 750 nm). The illuminating light is reflected by the angle surface. The illuminating light may have a narrow spectrum or a wide spectrum, for example it may be a white.

Typically, each image is a bidimensional array of pixel. If an image is a single-channel image, each pixel is associated to one image value (e.g. "lightness" value) for example in the range from 0 to 255 (deriving from a 8-bit word) or for example in the range from 0 to 65,535 (deriving from a 16-bit word) or for example in the range from 0 to 16,777, 215 (deriving from a 24-bit word). If an image is a color image, each pixel is associated to three image values: a first value (e.g. "R" or "H" value) for example in the range from 0 to 255, a second value (e.g. "G" or "S" value) for example in the range from 0 to 255, a third value (e.g. "B" or "V" value) for example in the range from 0 to 255.

The images of the plurality, i.e. the "starting images", are shallow field-depth images of the same portion of eye iridocorneal angle. To be precise, these images have the same image frame and are taken with different focus planes; considering possible movements of an eye and/or possible change in image frame due to change in focus plane, the image frame may change a little. In particular, all the "starting images" are taken using the same image capture axis.

Figure 4:
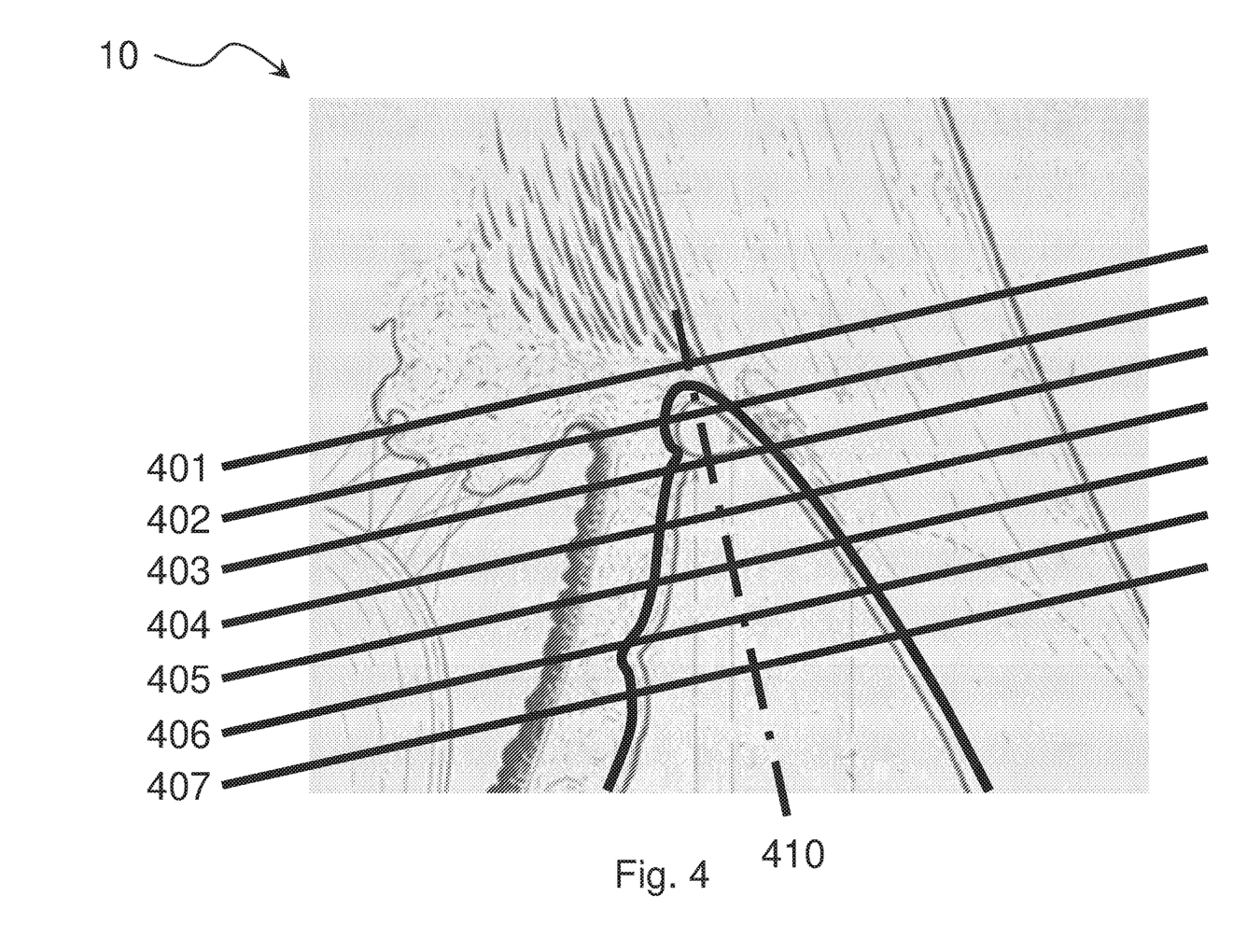
FIG. 4 illustrates the cross-section of the portion of the eye of FIG. 1 wherein a set of focus planes are highlighted through superimposed lines.

In FIG. 4, the traces of seven different focus planes 401-407 are shown superimposed on a picture of an eye iridocorneal angle. Typically, the number of these planes is in the range from e.g. 4 to e.g. 40 may be used. Typically, these planes are parallel to each other and the distance between these planes is in the range from e.g. 10 μm to e.g. 100 μm. In FIG. 4, the same image capture axis is labeled 410 and is perpendicular to the focus planes 401-407; axis 410 points approximately to the corner of the eye iridocorneal angle; axis 410 is approximately the bisector of the eye iridocorneal angle.

Typically, the above mentioned plurality of images are taken sequentially moving the focus plane step by step (for example from 401 to 402, from 402 to 403, from 403 to 404, from 404 to 405, from 405 to 406, from 406 to 407, or for example from 407 to 406, from 406 to 405, from 405 to 404, from 404 to 403, from 403 to 402, from 402 to 401). Typically, the delay between two consecutive shots is in the range from e.g. 10 μS to e.g. 100 μS.

Figure 5:
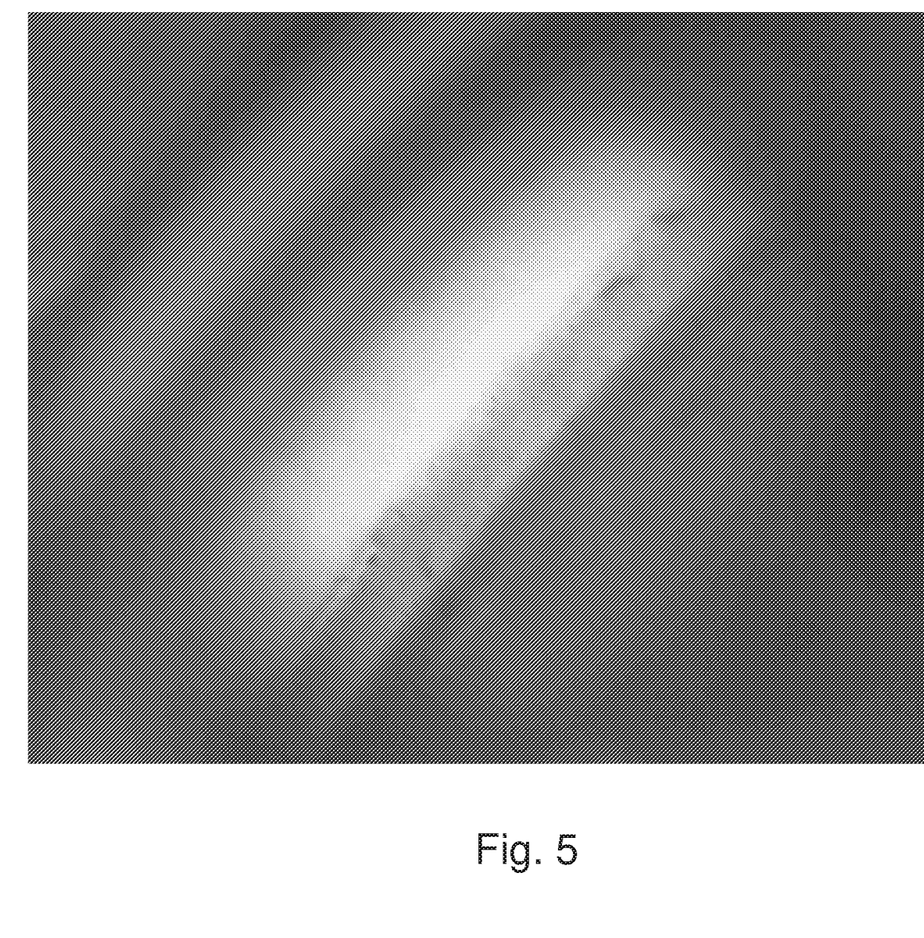
FIG. 5 illustrates a gonioscopic image with a shallow field-depth.

FIG. 5 is an example of such a bidimensional "starting image" with shallow field-depth. As can be noticed from FIG. 5, each of the various structures/tissues of the iridocorneal angle (i.e. iris, ciliary body, scleral spur, pigmented trabecular meshwork, non-pigmented trabecular meshwork, Schwalbe's line, cornea) forms a stripe in the figure; it may happen that one of more these structures/tissues cannot be seen in an image; the stripe may be straight or slightly curved (typically as an arc of circle). As can be noticed from FIG. 5, lightness is not uniform across the area of the image; in particular, the central portion of the image is lighter while the peripheral portion of the image is darker.

Figure 6:
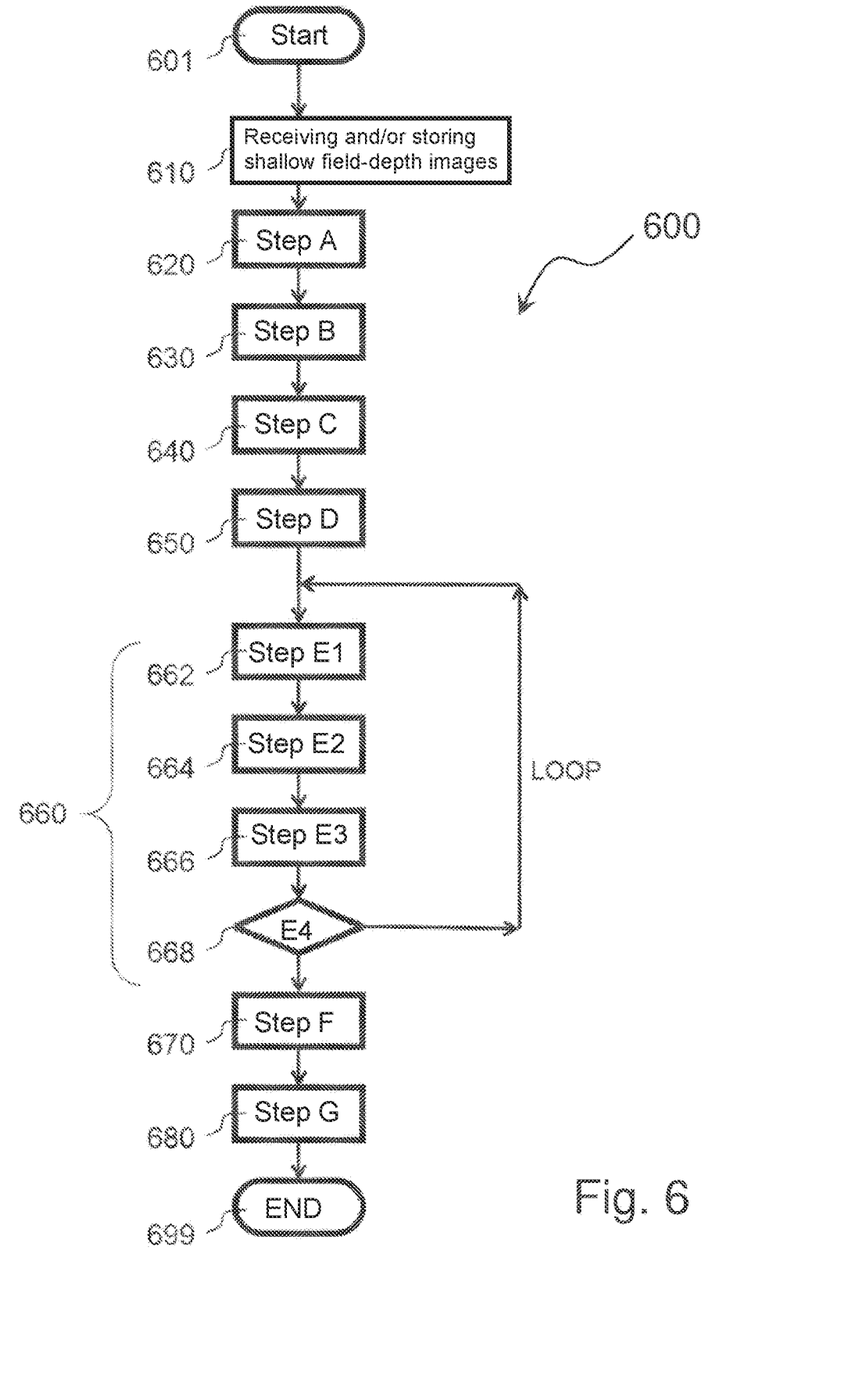
FIG. 6 illustrates a flow chart of an embodiment of a method according to the present invention.

In the following, reference will be made to the exemplary flow chart of FIG. 6. This flow chart has a START block 601, an END block 699, and a sequence of blocks from 610 to 680, as well as a LOOP that will be explained later. The set of blocks 662-668 connected in the LOOP may be considered a single block 660. As the method according to the present invention is designed to process images, block 610 corresponds to the activity of receiving and/or storing a plurality of shallow field-depth images (in particular color images) of a portion of an iridocorneal angle of an eye taken with different focus planes and with a same image frame as explained above. For example, with reference to FIG. 4, at the end of the above mentioned activity, seven color images 11-17 will be available for processing: image I1 is focused on plane 401, image I2 is focused on plane 402, image I3 is focused on plane 403, image I4 is focused on plane 404, image I5 is focused on plane 405, image I6 is focused on plane 406 and image I7 is focused on plane 407; for example, each of images I1-I7 is a XY matrix of 200×100 pixels and each pixel is associated to an "R" value in the range 0-255, a "G" value in the range 0-255 and a "B" value in the range 0-255. According to this example and to the iridocorneal angle surface of FIG. 4, no pixel of image I1 is "in-focus", and all pixels of image I1 are more or less "out-of-focus" because the focus plane 401 is placed beyond the iridocorneal angle surface (15 in FIG. 1); the distance varies from pixel to pixel. In general, the method according to the present invention comprises the steps of:

A) pre-processing (block 620) said plurality of images so to obtain a plurality of single-channel images if the images of said plurality are color images, B) calculating (block 630) an initial "focus map" starting from said plurality of single-channel images, C) creating (block 640) an initial estimated all-in-focus image starting from said initial focus map and said plurality of single-channel images, D) calculating (block 650) an initial "edge map" starting from said initial focus map and said plurality of single-channel images, E) iterating (block 660) a regularization process until a stop-regularization condition is met, wherein the regularization process comprises removing one or more edge points of the initial edge map by considering a reference model of an iridocorneal angle of an eye, and F) creating (block 670) said all-in-focus image starting from said plurality of images and a focus map last calculated in step E.

The reference model expresses at least one geometrical parameter of a surface of an iridocorneal angle of an eye.

A "focus map", that may be abbreviated FM and may be called also "depth map", is a XY matrix of pixels, each pixel being associated to an "image index". For example with reference to FIG. 4, the FM is a XY matrix of 200×100 pixels and each pixel is associated to a number between 1 and 7: "1" means that the pixel is "in-focus" on image I1, "2" means that the pixel is "in-focus" on image I2, "3" means that the pixel is "in-focus" on image I3, "4" means that the pixel is "in-focus" on image I4, "5" means that the pixel is "in-focus" on image I5, "6" means that the pixel is "in-focus" on image I6, "7" means that the pixel is "in-focus" on image I7.

According to a particularly advantageous embodiment of the present invention, "focus map" may be calculated as follows.

The starting point is a plurality of (preferably pre-processed) single-channel image matrices $$I_i(x,y)$$

wherein "i" is the image number (for example in FIG. 4, "i" is from 1 to 7).
Second order derivative magnitude matrices $$G_i(x,y)$$

are calculated (for example using twice the Sobel method and then considering the absolute value) for each image $I_i$.

The "focus map" or FM matrix derives from the formula $$FM(x,y) = \mathrm{argmax}_i(G_i(x,y))$$

An "edge map", that may be abbreviated EM, is a XY matrix of pixels, each pixel being associated to an "image index" (similarly to FM) and to an "edge indicator"; the edge indicator is a binary information being "true" (or an equivalent value) if the pixel belongs to an edge of an anatomical structure contained in the image frame (i.e. in at least one of the plurality of images), and "false" (or an equivalent value) if the pixel does not belong to an edge of an anatomical structure contained in the image frame. For example with reference to FIG. 4, the EM is a XY matrix of 200×100 pixels; considering any pixel of the matrix, if this pixel does not belong to an edge its "edge indicator" is "false" and its "image index" is "0", if this pixel belongs to an edge its "edge indicator" is "true" and its "image index" is the number between 1 and 7 corresponding to the image where the edge is "in-focus".

According to a particularly advantageous embodiment of the present invention, "edge map" may be calculated as follows.

Using the same second order derivative magnitude matrices $G_i$, we can define another support matrix, i.e. the MDF matrix, that represents the vectoral derivative propagation of anatomical structures edges due to the optical system blurring effect. It will be called "max derivative flow" matrix and can be written in vectoral form as:

$$MDF(x,y) = [f_x(x,y), f_y(x,y)]$$

where:

$$f_x(x,y) = -[\max_j G_j(x+\Delta x, y) - \max_i G_i(x,y)]$$

$$f_y(x,y) = -[\max_j G_j(x, y+\Delta y) - \max_i G_i(x,y)]$$

In other words, the MDF matrix elements consist of the vectoral components of the maximum second derivative variation along x and y axis, given two spatial increments $\Delta x$ and $\Delta y$, respectively.

It is also possible to calculate the variation direction in a point as:

$$\theta(x,y) = \arctan(f_y(x,y)/f_x(x,y))$$

MDF(x,y) and θ(x,y) may be used to extract anatomical structure edges with the corresponding depth indexes, i.e. "image indexes" (read following explanation).

Suppose that P (at coordinate X and Y) is an edge point. Then, it respects these conditions:
1. It corresponds to a relative maximum derivative value.
2. For a couple of distance values (i,j), there exist two points P1 (at coordinate X+i and Y+j) and P2 (at coordinate X-i and Y-j) in a narrow frame centered in P, characterized by a lower derivative magnitude and with MDF(P1) and MDF(P2) having the same direction but opposite verses.

These conditions state that P is a starting point of the blurring effect that propagates in a direction perpendicular with respect to the edge tangent line to that point.

The above-defined method according to the present invention requires creation of all-in-focus images not only at the end (i.e. at step F), but also for example at step C and possibly at step E as it will be explained afterwards.

At step F, the all-in-focus image is created by considering one-by-one all the pixels of the focus map last calculated in step E; for each pixel in the last focus map matrix there is a corresponding pixel in the all-in-focus image matrix. The creation of the all-in-focus image may be done by repeatedly doing as follows: considering a pixel in the last focus map with coordinates X and Y, extracting its "image index" from the focus map matrix, selecting the image corresponding to this "image index", extracting its image values (or value) from the matrix of this image at coordinates X and Y, storing these image values in the all-in-focus image matrix at coordinates X and Y.

Creation of all-in-focus images at other steps may be carried out similarly as above either considering only the lightness channel, in this case it may be called "Reconstructed Lightness" or RLI (corresponding to a matrix), or considering three color channels.

The above-defined method can be understood better in the light of the content of the article of Xuanwu Yin et al. published on the magazine "Applied Optics" in July 2016 at its References.

From the above, it is apparent that the method according to the present invention allows a 3D (=tridimensional) reconstruction of the surface of a sector of an eye iridocorneal angle. By combining 3D reconstructions of several sectors of the same angle, it is possible to obtain a 3D reconstruction of the whole angle surface. Indeed, in the flow chart of FIG. 6, block 680 corresponds to a (optional) step G.

Step G may correspond to deriving a 3D reconstruction of the angle surface from a single all-in-focus image, e.g. from the image of step F. It is to be noted that such 3D reconstruction derives from a set of shallow field-depth images taken frontally to the iridocorneal angle through light either in a visible spectrum (i.e. light with wavelengths in the range from approximately 400 nm to approximately 750 nm) or in an infrared spectrum (i.e. light with wavelengths beyond approximately 750 nm), the illuminating light being reflected by the angle surface. It is to be further noted that the illuminating light may have a narrow spectrum or a wide spectrum, for example it may be a white.

Alternatively, step G may correspond to deriving a measure, in particular an angle opening, from a single all-in-focus image, e.g. from the image of step F. It is to be noted that such measure may derive from a previous 3D reconstruction of the angle surface as described above.

Some preferred implementations of steps A, B, D, E will be described in the following.

In step A, said single-channel is typically a lightness-channel preferably in a LAB color space.

In fact, it has been found that lightness channel in LAB color space is the one that most accurately provides information about the contrast and, thus, about the detail distribution over an image. This kind of information is exploited to extract relevant features.

In step B, the initial focus map is preferably derived from bidimensional second-order derivatives (in particular the absolute values of the bidimensional second-order derivatives) of said plurality of single-channel images.

In fact, while first-order derivative magnitude may often take non negligible values even in correspondence of blurred edges, it has been found that second-order derivative magnitude is more sensitive to actual edges sharpness and is capable of spotting small textures that would have likely been hidden by wider blurred edges otherwise.

In step D, the initial edge map (similarly to the initial focus map) is preferably derived from bidimensional second-order derivatives of said plurality of single-channel images.

In fact, while first-order derivative magnitude may often take non negligible values even in correspondence of blurred edges, it has been found that second-order derivative magnitude is more sensitive to actual edges sharpness and is capable of spotting small textures that would have likely been hidden by wider blurred edges otherwise.

In step E, filtering is preferably carried out through a "bilateral filter". More preferably, the "bilateral filter" uses amplitude weights depending on an estimated all-in-focus image.

In fact, using the all-in-focus lightness image as regularity reference during the filtering process allows to set the filter weights according to the actual distribution of the anatomical structures over the frame. Filter is more aggressive in homogeneous region (such as the cornea) and more accurate in areas rich of useful details (such as the trabecular meshwork or the iris).

As already said, "Focus Stacking" according to the present invention takes into account how the eye iridocorneal angle surface is shaped and positioned in the images to be processed; in the following, some ways to do this will be explained especially at step E.

In step E, said reference model may express a first parameter being a maximum inclination of a (continuous and regular) surface of an iridocorneal angle of an eye and/or a second parameter being a direction of maximum inclination of a (continuous and regular) surface of an iridocorneal angle of an eye and/or a third parameter being a direction of minimum inclination of a (continuous and regular) surface of an iridocorneal angle of an eye.

In step E, said reference model may express one or more parameters as a function of regions (e.g. iris, trabecular meshwork, cornea, . . . ) of an iridocorneal angle of an eye.

In step E, the regularization process may comprise the steps of:

E1) processing (block 662) a previous-iteration focus map through an image filter thus generating a current-iteration focus map, E2) creating (block 664) a current-iteration estimated all-in-focus image starting from the current-iteration focus map and said plurality of single-channel images, E3) processing (block 666) a previous-iteration edge map by comparing the previous-iteration edge map and the current-iteration focus map thus generating a current-iteration edge map having less edge points, and E4) checking (block 668) the stop-regularization condition.

A typical stop-regularization condition in step E4 is based on a comparison between current-iteration focus map and previous-iteration focus map. The above steps 662-668 constitutes the LOOP; in fact, if the check at block 668 fails "control" returns to block 662.

In practice, cancelling of edge points in step E3 is a way of taking into account properties, shape and position of the eye iridocorneal angle surface.

According to a particularly advantageous embodiment of the present invention, "regularization" may be carried out as follows.

We start from an initial FM matrix, an initial EM matrix and an initial all-in-focus image; they bring different information about the original stack of images; the initial FM matrix is the spatial depth estimation matrix; the initial EM matrix is a sort of a subset of the FM matrix that contains depth indexes of strong detail references; initial all-in-focus image gives information on shades disposition and regularity.

It is necessary to regularize them through some suitable filtering strategy that effectively uses all available data.

A good solution is to iteratively filter these three matrices by cyclically using the information contained in one of them to regularize another one through different adopted criteria.

A principal role in this process is performed by the bilateral filter.

Bilateral filtering is a non-linear smoothing technique that is able to regularize an image while preserving its edges.

If we consider a kernel centered in a generic pixel p, the bilateral filter is a weighted average of pixel values that belong to the kernel. Their weights are proportional both to their distance from p (domain filtering), and to their amplitude value variation with respect to that of p (codomain filtering).

In other words, kernel pixels get lower weights when their Euclidean distance from p increases or when their value is very different from that of p. In this way, the filter mostly smooths regions with a similar value range.

Mathematically, the bilateral filter can be expressed by the following equation:

The first exponential in this equation is a Gaussian shaped filtering window with fixed weights given by the Euclidean distance between the points of its support and its center. It does not change during the filtering process, it is, thus, the linear part of the filter.

The second exponential is a Gaussian function from which amplitude weights are extracted. As the differences between lightness values belonging to the filtering kernel change with the shift of the filter on an image, weights must be calculated for each different kernel position. This is the non-linear part of the filter.

In the standard de-noising case, the bilateral filter uses amplitude weights provided by the same image to be filtered. However, according to the present invention, this is not the best alternative (although possible) as we want to smooth the FM that shows some regularity incongruences and thus cannot be taken as a reference itself. This is a regularization problem.

For this goal, an alternative form of the filter is proposed herein; it takes advantage of regularity information provided by a second image that is, in our study case, the Reconstructed Lightness:

where:

FM is the Focus Map

RLI is the reconstructed lightness channel p is the central point of the kernel $N^p$ is the set of points that belong to the squared kernel centered in p p' is a generic point in $N^p$ $K_p$ is the normalization factor $\sigma_s$ is the spatial standard deviation of the Gaussian $\sigma_4$ is the weight for the amplitudes k is the number of the current iteration The most important parameters of the bilateral filtering process are $\sigma_s$ and $\sigma_r$. The former, i.e. $\sigma_s$, controls the spatial weights; the more its value increases, the more the filter becomes flatten and approximates an average filter. The latter, i.e. $\sigma_r$, controls the edge preservation. If its value increases, then edges are less protected and when it tends to infinity, the whole filter becomes a simple Gaussian spatial kernel.

In this modified filter, amplitude weights are calculated on the RLI image. This means that FM values are filtered more aggressively if the corresponding RLI image values are homogeneous.

After each filtering iteration the EM values overwrite the corresponding FM values to avoid depth spatial compression.

Edges are selected by evaluating the direction of the maximum second derivative propagation in the images of the original sequence, assuming as an ideal case that the derivative flow of a blurring edge is strictly monotonic.

In the real case, however, some blurred edges, for example those created by highly reflective areas, contribute to EM matrix with wrong references because of the non-monotonicity of the edge derivative expansion.

These false references are preferably corrected during the filtering process for a better regularization of the FM.

It is reasonable to think that, if an edge is false, it should be surrounded by a great number of right index references in the FM.

While filtering the FM, most of the points in the filter kernel are true references, and they usually average pixels belonging to wrong edges. If an anchoring edge is very different from the corresponding value in the filtered FM, thanks to the regularity assumptions of the anatomical region under observation, its incorrectness is very likely.

The wrong edge is erased before the next iteration starts. The maximum difference between the EM value and the corresponding FM value allowed for not erasing edges decreases during the filtering process and leads to a progressive refinement of the solution.

Reference indexes change smoothly from two side border stripes to the center stripe of the image, accordingly with the expected structure of the iridocorneal angle.

As just explained, regularization is very important.

Furthermore, also pre-processing of images is quite important for accomplishing a satisfactory end result both in step A and in step F; in the following, some hints will be provided.

Step A may comprise one or more of the following pre-processing steps:
 image equalization for enhancing contrast,
 image low-pass filtering for noise reduction,
 image registration for images alignment.

In step F, the all-in-focus image may be created starting from the "starting images" being previously subject to:
 image equalization for enhancing contrast, and/or
 image low-pass filtering for noise reduction, and/or
 image registration for images alignment.

Such computations in step F may take advantage of computations in step A; in particular an image registration in step F may be carried out according to the same transformation as for an image registration in step A.

Advantageously, the method according to the present invention may be embodied into a computer program product loadable into the internal memory of a digital computer. In particular, software code portions may be designed to perform the steps of such method.

Furthermore, advantageously, the method according to the present invention may be embodied into an apparatus. In particular, an apparatus for creating an all-in-focus color image of a portion of an iridocorneal angle of an eye may comprise:
 means for receiving and/or storing a plurality of shallow field-depth images (in particular color) of a portion of an iridocorneal angle of an eye taken with different focus planes, and
 means for carrying out such method.

The invention claimed is:

1. A method of creating an all-in-focus image of a portion of an iridocorneal angle of an eye starting from a plurality of images, the images of said plurality being shallow field-depth images of said portion taken with different focus planes and with a same image frame, the method comprising the steps of:
   A) pre-processing said plurality of images so to obtain a plurality of single-channel images if the images of said plurality are color images,
   B) calculating an initial focus map starting from said plurality of single-channel images,
   C) creating an initial estimated all-in-focus image starting from said initial focus map and said plurality of single-channel images,
   D) calculating an initial edge map starting from said initial focus map and said plurality of single-channel images,
   E) iterating a regularization process until a stop-regularization condition is met, wherein the regularization process comprises removing one or more edge points of the initial edge map by considering a reference model of an iridocorneal angle of an eye, and
   F) creating said all-in-focus image starting from said plurality of images and a focus map last calculated in step E;
   wherein in step E said reference model expresses a first parameter being a maximum inclination of a surface of an iridocorneal angle of an eye and/or a second parameter being a direction of maximum inclination of a surface of an iridocorneal angle of an eye and/or a third parameter being a direction of minimum inclination of a surface of an iridocorneal angle of an eye.

2. The method of claim 1, wherein in step A said single-channel is a lightness-channel preferably in a LAB color space.

3. The method of claim 1, wherein in step E filtering is carried out through a "bilateral filter".

4. The method of claim 3, wherein said "bilateral filter" uses amplitude weights depending on an estimated all-in-focus image.

5. The method of claim 1, wherein in step B the initial focus map is derived from bidimensional second-order derivatives of said plurality of single-channel images.

6. The method of claim 1, wherein in step D the initial edge map is derived from bidimensional second-order derivatives of said plurality of single-channel images.

7. The method of claim 1, wherein in step E said reference model expresses one or more parameters as a function of regions of an iridocorneal angle of an eye.

8. The method of claim 1, wherein in step E the regularization process comprises the steps of:
   E1) processing a previous-iteration focus map through an image filter thus generating a current-iteration focus map,
   E2) creating a current-iteration estimated all-in-focus image starting from the current-iteration focus map and said plurality of single-channel images,
   E3) processing a previous-iteration edge map by comparing the previous-iteration edge map and the current-iteration focus map thus generating a current-iteration edge map having less edge points, and
   E4) checking the stop-regularization condition.

9. The method of claim 8, wherein in step E4 the stop-regularization condition is based on a comparison between current-iteration focus map and previous-iteration focus map.

10. The method of claim 1, wherein step A comprises one or more of the following pre-processing steps:
   image equalization for enhancing contrast,
   image low-pass filtering for noise reduction,
   image registration for images alignment.

11. The method of claim 1, wherein in step F said all-in-focus image is created starting from said plurality of images being previously subject to:
   image equalization for enhancing contrast, and/or
   image low-pass filtering for noise reduction, and/or
   image registration for images alignment.

12. The method of claim 11, wherein computations in step F takes advantage of computations in step A, in particular an image registration in step F is carried out according to the same transformation as for an image registration in step A.

13. A non-transitory computer-readable medium storing programming instructions, that when executed by a processor, causes the processor to perform the method according to claim 1.

14. An apparatus for creating an all-in-focus image of a portion of an iridocorneal angle of an eye comprising:
   means for receiving and/or storing a plurality of shallow field-depth images of a portion of an iridocorneal angle of an eye taken with different focus planes and with a same image frame, and
   means for carrying out the method according to claim 1.

* * * * *